(12) United States Patent
Simanovich et al.

(10) Patent No.: US 11,423,226 B2
(45) Date of Patent: Aug. 23, 2022

(54) EMAIL CONTENT EXTRACTION

(71) Applicant: The Travelers Indemnity Company, Hartford, CT (US)

(72) Inventors: Boris Simanovich, West Hartford, CT (US); Michelle M. Buxton, Colchester, CT (US); Joseph Dubsky, Norton, MA (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 397 days.

(21) Appl. No.: 16/556,884

(22) Filed: Aug. 30, 2019

(65) Prior Publication Data

US 2021/0064698 A1    Mar. 4, 2021

(51) Int. Cl.
| | |
|---|---|
| *G06F 40/295* | (2020.01) |
| *G06N 20/00* | (2019.01) |
| *G06F 40/30* | (2020.01) |
| *G10L 15/26* | (2006.01) |
| *G06V 30/10* | (2022.01) |
| *G06F 16/907* | (2019.01) |
| *G06K 9/62* | (2022.01) |
| *G06V 10/40* | (2022.01) |

(52) U.S. Cl.
CPC .......... *G06F 40/295* (2020.01); *G06F 16/907* (2019.01); *G06F 40/30* (2020.01); *G06N 20/00* (2019.01); *G06K 9/6267* (2013.01); *G06V 10/40* (2022.01); *G06V 30/10* (2022.01); *G10L 15/26* (2013.01)

(58) Field of Classification Search
CPC ...... G06F 40/295; G06F 16/907; G06F 40/30; G06F 16/334; G06N 20/00; G06N 3/08; G06K 9/46; G06K 9/6267; G06K 2209/01; G10L 15/26
USPC ........................................................ 704/900
See application file for complete search history.

(56) References Cited

U.S. PATENT DOCUMENTS

| | | | | |
|---|---|---|---|---|
| 8,819,142 | B1 * | 8/2014 | Golub | H04L 51/12 709/206 |
| 9,514,414 | B1 * | 12/2016 | Rosswog | G06N 20/00 |
| 9,680,782 | B2 * | 6/2017 | Barshow | H04L 51/16 |
| 2006/0195533 | A1 * | 8/2006 | Isozaki | G06Q 10/107 709/206 |
| 2006/0195534 | A1 * | 8/2006 | Isozaki | G06Q 10/10 709/206 |

(Continued)

*Primary Examiner* — Akwasi M Sarpong
(74) *Attorney, Agent, or Firm* — Cantor Colburn LLP

(57) ABSTRACT

A system includes a processing device and memory device configured to access an email message received at a mail server, extract a plurality of correspondence data from the email message, and apply a correspondence classifier to the correspondence data to determine a request type of the email message. The processing device is further configured to extract a plurality of entities from the email message in a free-form format, where extracting is performed based on determining that the request type is supported. The processing device can also determine a confidence level of the extracting of the entities, perform a lookup of the entities in one or more records of a database based on determining that the confidence level is above a confidence threshold, and generate a new processing request including prepopulated data fields populated with the entities based on identifying a match in the one or more records of the database.

23 Claims, 12 Drawing Sheets

(56) References Cited

U.S. PATENT DOCUMENTS

| | | | | |
|---|---|---|---|---|
| 2008/0104052 A1* | 5/2008 | Ryan | G06Q 10/06 | 707/999.005 |
| 2011/0106892 A1* | 5/2011 | Nelson | G06Q 10/109 | 709/206 |
| 2011/0145023 A1* | 6/2011 | Stahl | G06Q 30/02 | 705/4 |
| 2011/0295852 A1* | 12/2011 | Wang | G06F 16/9535 | 707/E17.014 |
| 2012/0216046 A1* | 8/2012 | McDougal | H04L 63/1441 | 713/183 |
| 2013/0081142 A1* | 3/2013 | McDougal | G06F 21/577 | 726/24 |
| 2014/0365232 A1* | 12/2014 | Sadeghi | G06F 40/30 | 705/2 |
| 2015/0081824 A1* | 3/2015 | Caldwell | G06F 16/33 | 709/206 |
| 2016/0180248 A1* | 6/2016 | Regan | G09B 5/00 | 706/12 |
| 2017/0017899 A1* | 1/2017 | Maor | G06F 16/285 | |
| 2017/0161372 A1* | 6/2017 | Fernández | G06F 40/211 | |
| 2018/0102998 A1* | 4/2018 | Caldwell | G06F 16/33 | |
| 2018/0232443 A1* | 8/2018 | Delgo | G06F 40/295 | |
| 2018/0336574 A1* | 11/2018 | Mohan | G06Q 50/01 | |
| 2019/0020687 A1* | 1/2019 | Noon | G06F 21/606 | |
| 2019/0171943 A1* | 6/2019 | Pao | G06Q 50/30 | |
| 2019/0266254 A1* | 8/2019 | Blumenfeld | G06Q 40/08 | |
| 2019/0363959 A1* | 11/2019 | Rice | G06F 16/2457 | |
| 2020/0233926 A1* | 7/2020 | Ghatak | G06F 16/345 | |
| 2020/0401663 A1* | 12/2020 | Goldbraich | G06F 40/30 | |

* cited by examiner

EMAIL CONTENT EXTRACTION

BACKGROUND

Email handling systems may support a general-purpose or an organizational email address that receives content from many parties on a variety of subjects at a shared inbox. Manual processing of email messages from a shared inbox is typically a time-consuming process, as reviewers read through the email messages and try to determine how each message should be processed. As one example, some shared inboxes may receive one million or more messages per year. When an email reviewer processes email messages, the messages can be forwarded to one or more secondary systems for further processing based on how the reviewer classifies the messages. If the email is incorrectly classified and sent to the wrong secondary system, there are additional processing, storage, and network resource demands to reclassify the email and send it to a more appropriate recipient. Email that includes attached files further increases the processing, storage, and network resources needed when a misclassification occurs, and the email is rerouted one or more times.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a system for email content extraction is provided. The system may be used for various practical applications of extracting data from free-form content and using the data to perform lookup operations, prepopulating related forms, routing data within an enterprise, and triggering various processing requests. By applying a sequence of extraction, classification, and analysis steps, the system can ensure that a sufficiently high level of confidence exists through the steps to avoid misclassification or triggering multiple incorrect or unneeded processing steps. For email messages exhibiting a lower level of confidence through artificial intelligence/machine learning processes, such email messages can be retained within a shared inbox of a mail server. For email messages that can be classified with data extracted and used with a confidence level above a confidence threshold, such email messages can be removed from manual processing steps. The system can perform additional data verification steps to ensure proper routing that is not readily performed by human reviewers. Thus, network, storage, and subsequent processing can be reduced by avoiding errant routing and rerouting of messages that may otherwise be performed when relying upon manual processing techniques.

In embodiments, various technology challenges may also be addressed to enhance machine learning speed and accuracy. As one example, where a group of multiple models for machine learning is applied to derive multiple characteristics associated with email content, rather than separately developing machine learning models for each feature of interest, transfer learning can be used such that new models only need partial training/retraining. As one example, a model trained to identify a policy number within free-form text or image data can be partially extracted to capture a core learning structure and weights/coefficients, with a new model top-level applied to form a model to identify account numbers having different formats from policy numbers. For instance, both models may internally look for alphanumeric sequences of particular lengths and delimiters between subgroups of alphanumeric characters. This transfer learning process can more quickly and accurately train new models by reusing portions of learning from previously developed and verified models.

Figure 1:
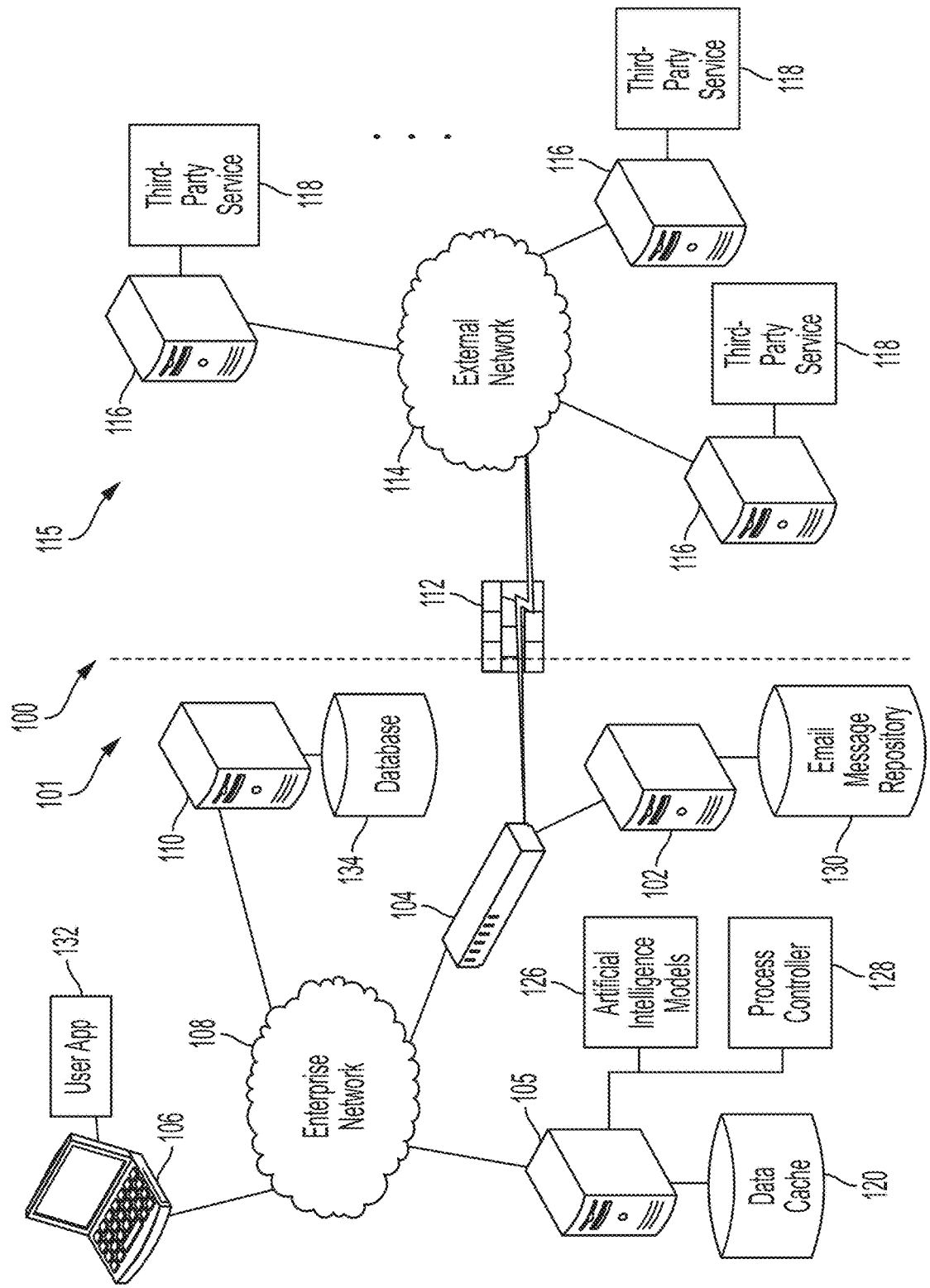
FIG. 1 depicts a block diagram of a system according to some embodiments of the present invention.

Turning now to FIG. 1, a system 100 is depicted upon which email content extraction may be implemented. The system 100 can include an enterprise network zone 101 including a mail server 102 coupled to a gateway 104 operable to establish communication with a data processing server 105, one or more user systems 106, one or more data storage servers 110, and/or other devices (not depicted) through an enterprise network 108. The gateway 104 may also establish communication to an external network 114, for instance, through a firewall 112, to send and receive data to a plurality of third-party servers 116 in an external network zone 115. The third-party servers 116 can each execute one or more third-party services 118. Examples of third-party services 118 can include, for instance, remote email services that route email messages from various sources that target the mail server 102. Other types of third-party services 118 can include support services for cloud-based processing in support of the data processing server 105, user systems 106, and/or other servers and systems (not depicted). For example, file-type conversion, optical character recognition, and other such processing loads performed in processing email messages may be offloaded through service calls from the data processing server 105 or mail server 102 to one or more of the third-party services 118. In embodiments, the enterprise network zone 101 can include a plurality of networked resources that may be distributed over multiple locations, where the networked resources are access-controlled by an enterprise. The external network zone 115 may link to networked resources that are outside of enterprise control and may be distributed over a wide geographic area.

In the example of FIG. 1, the data processing server 105 is operatively coupled to a data cache 120 that provides short-term data buffering in support of processing and extraction of data from email messages using artificial intelligence (AI) models 126. A process controller 128 can execute on the data processing server 105 to manage data acquisition, use of AI models 126, storage to the data cache 120, and interfacing with other components of the system 100. The AI models 126 can be trained to detect features of interest in the email message from an email message repository 130 managed by the mail server 102. Further, the AI models 126 can apply multiple levels of models to discover patterns in email messages received at the email message repository 130. The AI models 126 can be applied across various file types and data structures, such as images, text, and/or other data formats. The AI models 126 can apply machine-learning algorithms to identify various features, such as a request type of an email message using a correspondence classifier. The AI models 126 can also apply machine learning to extract a plurality of entities from an email message in a free-form format. The extraction of entities may be performed based on determining that a request type of the email message is supported. Each entity extracted from an email message can have an associated confidence level. The process controller 128 can perform further actions, such as accessing a database 134 of the data storage systems 110 based on determining that a confidence level is above a confidence threshold. As an example, each type of entity (e.g., policy name, account number, account name, entity name, transaction effective date, etc.) may have separate AI models 126 with separate confidence levels produced. The AI models 126 can learn new types of patterns, variations, and/or rules as new content is encountered in the email message repository 130.

Examples of algorithms that may be applied to train the AI models 126 can include one or more of: supervised learning, unsupervised learning, semi-supervised learning, and reinforcement learning. For instance, labeled training data can be provided to train the AI models 126 to find model parameters that assist in detecting unlabeled data in the data sets. Linear regression and linear classifiers can be used in some embodiments. Other embodiments may use decision trees, k-means, principal component analysis, neural networks, and/or other known machine-learning algorithms. Further, the AI models 126 may use a combination of machine-learning techniques that can differ depending on whether the data set includes text, image data, video data, and/or audio data. For example, supervised learning with entity extraction can be used to learn text values, while generative adversarial networks can be used for image learning.

A user application 132 executed on one or more of the user systems 106 may provide an interface to view and edit data extracted from the email message content. The user application 132 can interface with the process controller 128 to determine when data extracted using the AI models 126 is available in prepopulated data fields. For instance, as many email messages are received at the mail server 102 and stored in the email message repository 130, the process controller 128 can access an email message at the mail server 102 and extract correspondence data from the email message. A correspondence classifier of the AI models 126 can be applied to the correspondence data to determine a request type of the email message. The process controller 128 can extract entities from the email message in a free-form format based on determining that the request type is supported. The AI models 126 can determine a confidence level of the extracting of the entities, and the process controller 128 can access the data storage servers 110 to perform a lookup of the entities in one or more records of the database 134 based on determining that the confidence level is above a confidence threshold. Records of the database 134 can be associated with an existing account, policy, property, or other type of information. The process controller 128 can generate a processing request that includes providing prepopulated data fields populated with the entities based on identifying a match in the one or more records of the database 134. The prepopulated data fields can be presented to the application 132 for further processing or can trigger additional processing without intervention of a user.

In the example of FIG. 1, each of the mail server 102, data processing server 105, user systems 106, data storage servers 110, and third-party servers 116 can include one or more processors (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100. Although depicted separately, one or more of the mail server 102, data processing server 105, user systems 106, and/or data storage servers 110 can be combined or further subdivided.

The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 are operated by analysts seeking information captured in relevant email messages without having to directly examine all of the email messages held in the email message repository 130 and while avoiding copy/paste operations or manual data entry into one or more forms of data within the email messages. It will be understood that while only a single instance of the user systems 106 is shown in FIG. 1, there may be multiple user systems 106 coupled to the enterprise network 108 in embodiments.

Each of the mail server 102, data processing server 105, user systems 106, data storage servers 110, and third-party servers 116 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

Figure 2:
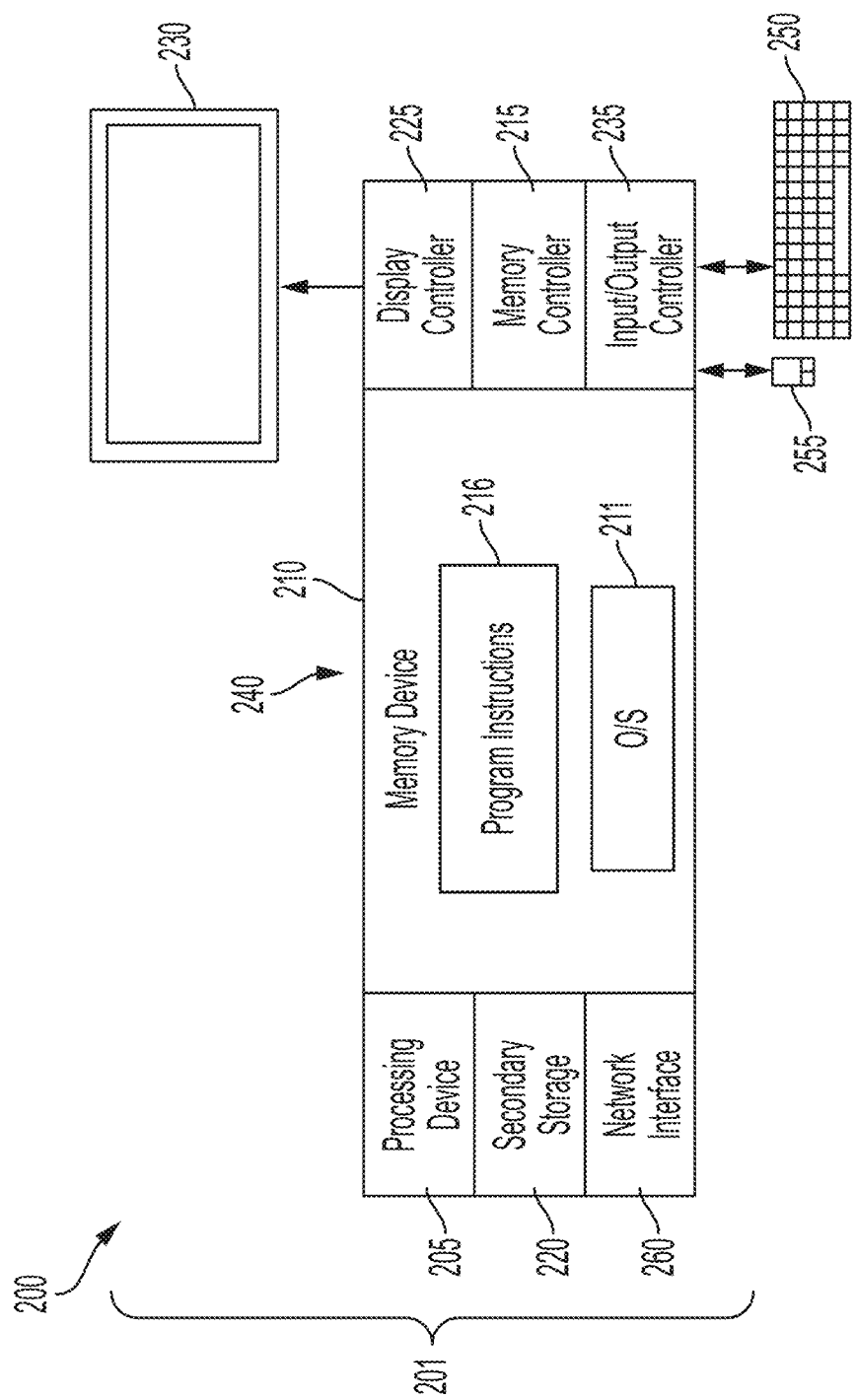
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the mail server 102, data processing server 105, user systems 106, data storage servers 110, and/or third-party servers 116 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the third-party services 118, AI models 126, process controller 128, and/or user application 132 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106 of FIG. 1, the network interface 260 can establish communication channels with at least one of the mail server 102, data processing server 105 or data storage servers 110 via the enterprise network 108 and/or with third-party servers 116 via external network 114.

Figure 3:
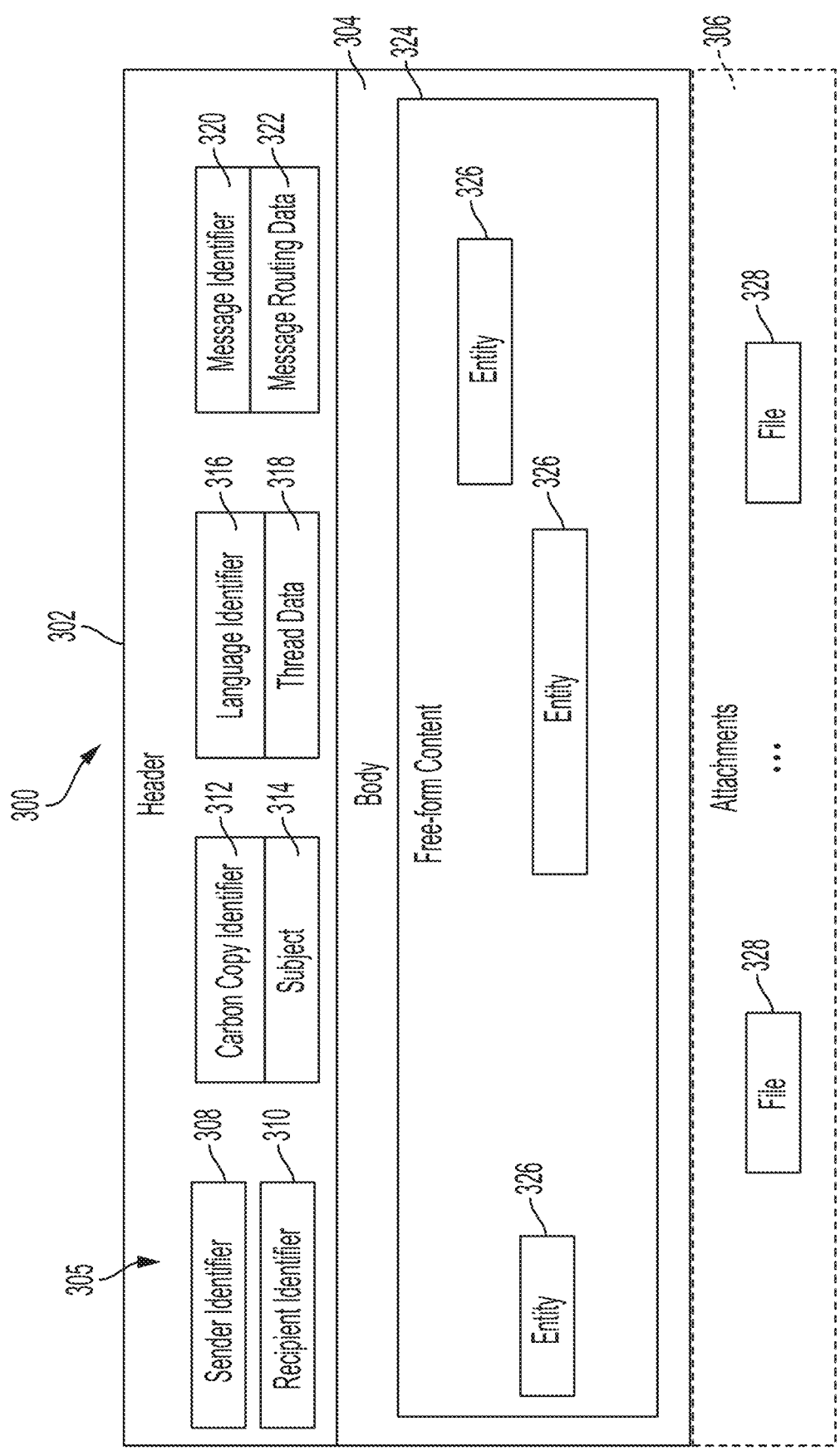
FIG. 3 depicts elements of an email message under analysis according to some embodiments of the present invention.

FIG. 3 depicts elements of an email message 300 under analysis according to some embodiments. The email message 300 is an example of content that may be available for analysis, classification, and extraction by the AI models 126 and process controller 128 of FIG. 1. The email message 300 can be accessed through the mail server 102 and stored in the email message repository 130 of FIG. 1 until processing is complete. The email message 300 can include a header 302, a body 304, and may also include attachments 306. The header 302 can include a plurality of correspondence data 305, such as a sender identifier 308, a recipient identifier 310, a carbon copy (cc) identifier 312, a subject 314, a language identifier 316, thread data 318, a message identifier 320, and message routing data 322. The sender identifier 308 can identify an email address of the originator of the email message 300. The recipient identifier 310 can be associated with an email address of an inbox at the mail server 102 of FIG. 1. The carbon copy identifier 312 can identify one or more secondary recipients, which may include the email address of an inbox at the mail server 102 where the recipient identifier 310 is associated with a different inbox, for example. The subject 314 can include descriptive text associated with the body 304. The language identifier 316 can identify the language of text in the body 304 and/or attachments 306. In embodiments with multiple language support, the language identifier 316 can be used to select between AI models 126 of FIG. 1 for models trained using different languages. The thread data 318 can identify a message thread where a sequence of email messages 300 are related as part of a common topic or exchange of messages between multiple parties. The message identifier 320 can be used to identify the email message 300, for instance, as part of indexing the email message repository 130 of FIG. 1. The message routing data 322 can indicate a path through the external network zone 115 and enterprise network zone 101 that the email message 300 took to reach the mail server 102.

The body 304 of the email message 300 can include free-form content 324. Rather than being structured as a form with specific fields, the free-form content 324 can be formatted in natural language and include a plurality of entities 326 mixed with other content. For example, the free-form content 324 can be in sentences or phrases with the entities 326 scattered without an apparent structure or consistent format. As an example, the free-form content 324 can be, "I need to update the limits on the Jones account by $500 k, effective August 1. Best regards, Mary K." As another example, there can be multiple accounts, policies, or other types of data combined in the same email message 300. For instance, the free-form content 324 can be, "Cancel policy 1234-567BH-00. Also, I need to add another vehicle to account 679-222-9382, effective October 1." Because the free-form content 324 is typically free-form text, it may include spelling errors, grammatical errors, abbreviations, and other such variances. Further, the contents of the email message 300 may be incomplete and can be completed through a lookup operation in database 134 and/or user input.

The attachments 306 can include a variety of files 328 with multiple file types, such as text files, documents, spreadsheets, images, video, audio clips, and other such formats known in the art. Collectively, the correspondence data 305, free-form content 324, and attachments 306 can provide a basis for classification, extraction, and context of the entities 326 with respect to existing records in the database 134 of FIG. 1.

Figure 4:
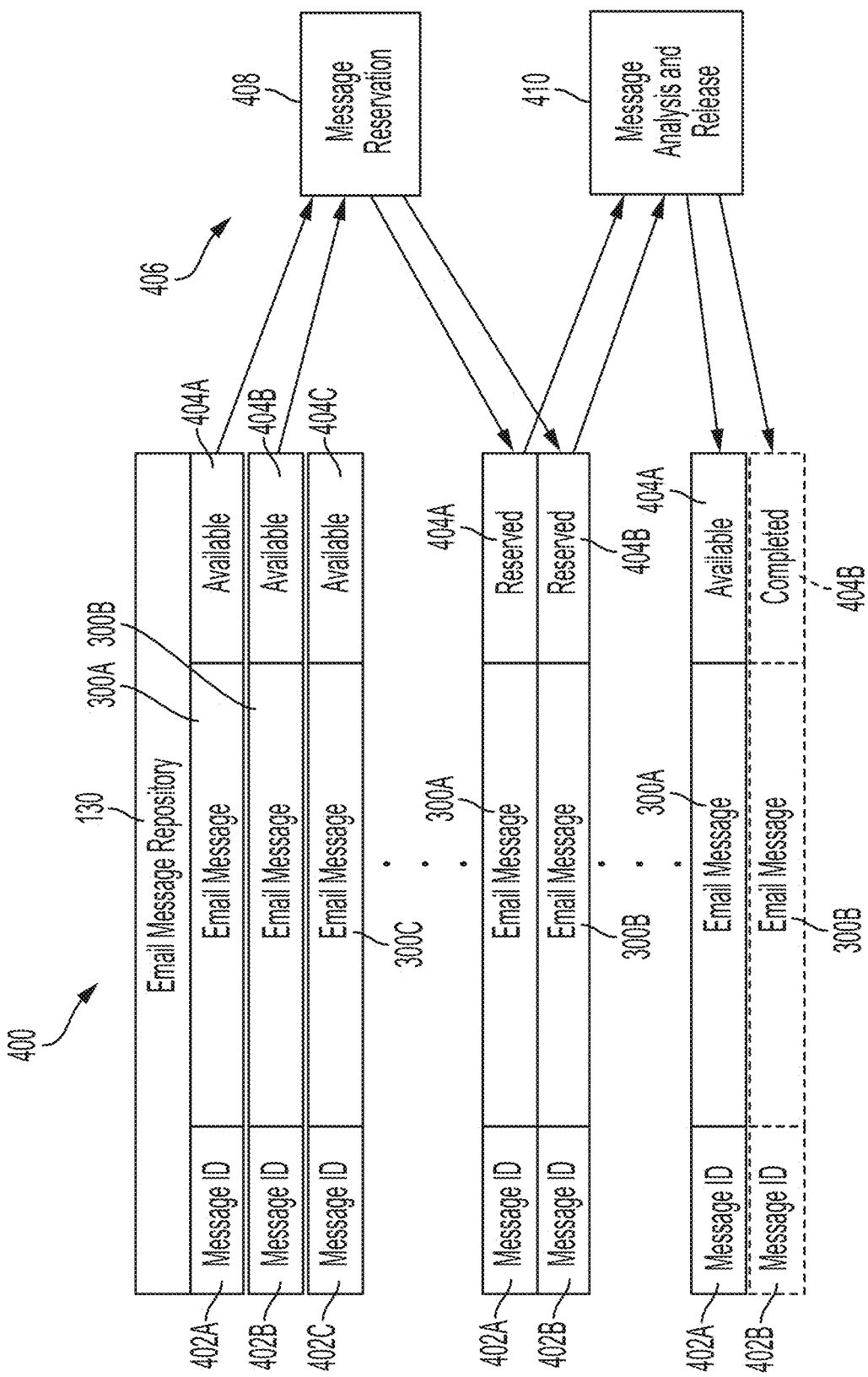
FIG. 4 depicts an email message repository transition sequence according to some embodiments of the present invention.

FIG. 4 depicts an email message repository transition sequence 400 according to embodiments. The email message repository 130 can include many (e.g., thousands of) email messages 300A, 300B, 300C, etc. Each of the email messages 300A, 300B, 300C can have a unique value of a message identifier 402A, 402B, 402C. In some embodiments, the message identifier 402A, 402B, 402C is the same as the message identifier 320 of FIG. 3. In other embodiments, the message identifier 402A, 402B, 402C is different that the message identifier 320, where the message identifier 402A, 402B, 402C is managed by the mail server 102 and the message identifier 320 is created by a sender of the email message 300. Each of the email messages 300A, 300B, 300C may have an associated status 404A, 404B, 404C in the email message repository 130. For example, email messages 300A, 300B, 300C may initially have respective status 404A, 404B, 404C values of "available", indicating that the email messages 300A-300C are available for processing by the process controller 128 of FIG. 1. Message processing 406 performed by the process controller 128 can include message reservation 408, where email messages 300A, 300B are reserved for analysis as indicated by a transition of status 404A and 404B to "reserved". Once the email messages 300A, 300B are reserved, other processes may be blocked from accessing the email messages 300A, 300B other than the initiator of the reservation. In some embodiments, reservations may have expiration values to prevent a lockout in case of a system issue or other such event. The message processing 406 of the reserved email messages 300A, 300B can include message analysis and release 410, where the process controller 128 applies AI models 126 of FIG. 1 to determine whether email messages 300A, 300B can be understood with meaningful content extracted. If a request type of the email messages 300A, 300B is not supported or identified or if the confidence level is below the confidence threshold, then the email messages 300A, 300B are released, such as the example of email message 300A. If the request type is supported and the confidence is above the confidence threshold, then the status of the email message, such as status 404B of email message 300B, can be changed to "completed" to prevent subsequent repetitive processing attempts. Alternatively, upon successful completion of processing, the email message 300B can be deleted or otherwise removed from the email message repository 130. Although the example of FIG. 4 only illustrates three email messages 300A-300C, it will be understood that any number of email messages 300 can be supported in the email message repository 130.

Figure 5:
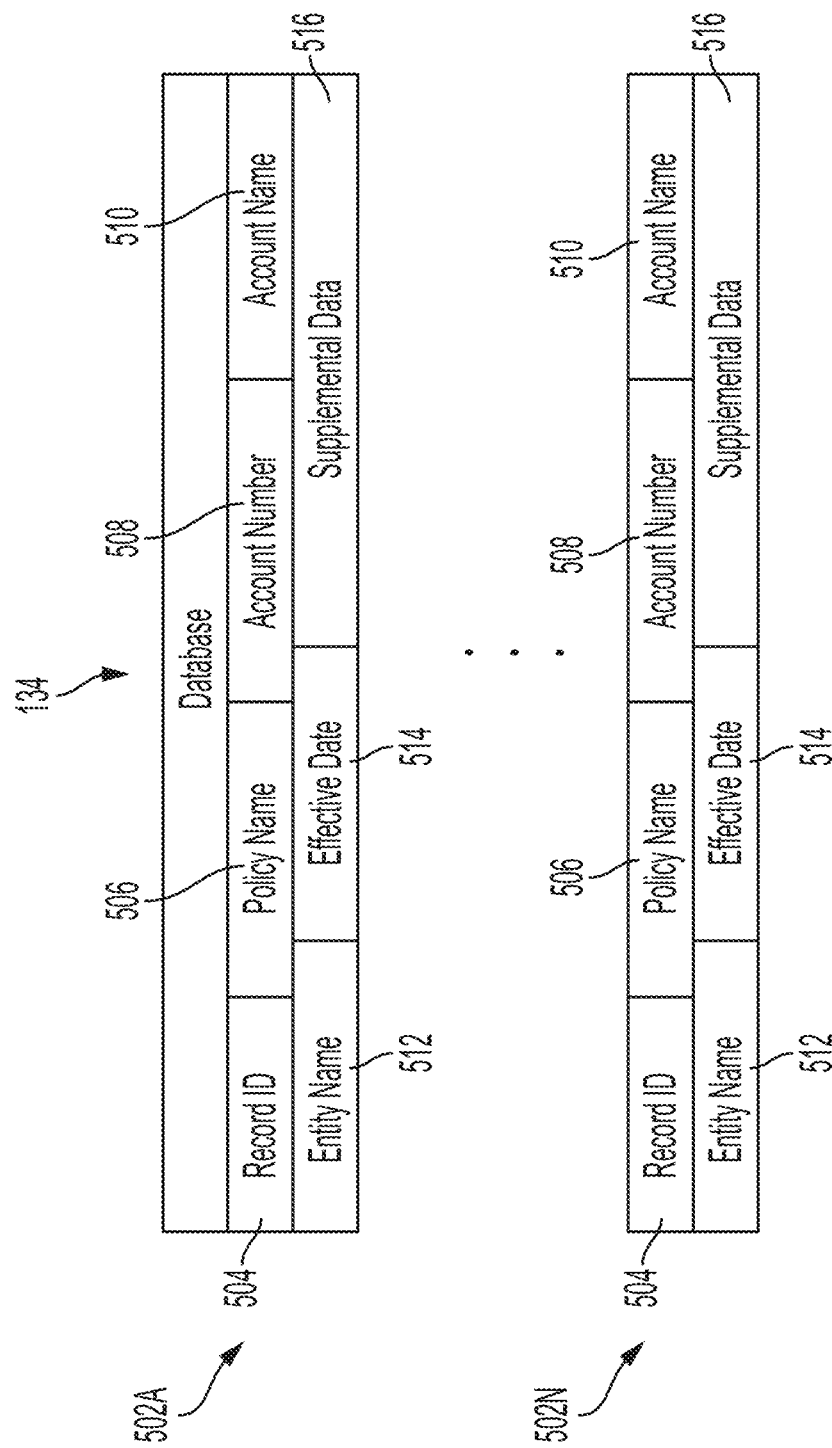
FIG. 5 depicts examples of records in a database according to some embodiments of the present invention.

FIG. 5 depicts examples of records 502A-502N in the database 134 according to embodiments. Each of the records 502A-50N can include a plurality of fields, such as a record identifier 504, a policy name 506, an account number 508, an account name 510, an entity name 512, an effective date 514, supplemental data 516, and other such data. The record identifier 504 can uniquely identify each of the records 502A-502N. The policy name 506 can include text identifying a policy, such as an insurance policy. The account number 508 can be an alphanumeric value including predetermined formatting constraints. The account name 510 can be a text value that describes an underlying account. The entity name 512 can be a text value identifying an owner or beneficiary of the associated account. The effective date 514 can be a date-time value indicating when an associated policy is in force. The supplemental data 516 can include additional files, data, or links. For instance, supplemental data 516 can include a copy of the email message 300, files 328, or other relevant data or links. While the records 502A-502N depict one example, it will be understood that many variations are possible in the content and number of records 502A-502N.

Figure 6:
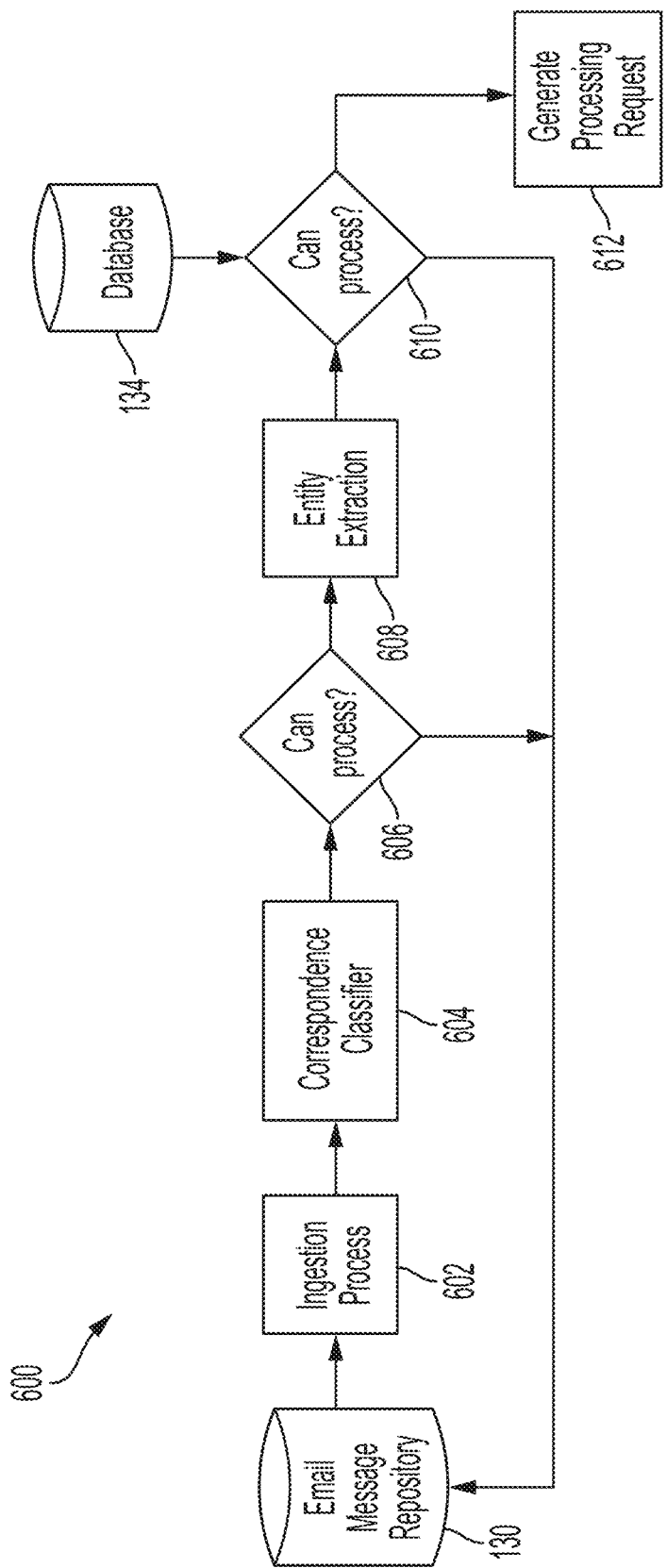
FIG. 6 depicts a process using a correspondence classifier and entity extraction according to some embodiments of the present invention.

FIG. 6 depicts a process 600 using a correspondence classifier and entity extraction according to some embodiments. The process 600 can be performed, for example, by the process controller 128 of FIG. 1. In process 600, an ingestion process 602 can access the email message repository 130 for a next available instance of an email message 300 for analysis. The ingestion process 602 can change a status of the email message 300 to "reserved", such as status 404A of email message 300A of FIG. 4. The ingestion process 602 can access the correspondence data 305 to discover information, such as a sender, recipients, subject, language, and other such information. The ingestion process 602 may also analyze any attachments 306 and can perform any available conversion processes if needed, such as optical character recognition, audio-to-text conversion, video frame capture and conversion, and the like. The ingestion process may also perform format normalization of identified fields to reduce downstream processing burdens, such as formatting of date information, expanding abbreviations, and other such normalizations.

After the ingestion process 602, a correspondence classifier 604 can be applied to the correspondence data 305 using the AI models 126 to determine a type of transaction, which can be referred to as a request type. In some embodiments, transaction types can refer to timing constraints of request types. For example, a request type can be to add a driver to a policy, change an address on a policy, add a vehicle to a policy, and the like. The transaction type can be an immediate transaction that is effective as soon as processing of the request type is complete or can be a future transaction type that sets a transaction effective date to a future date for the request type to become effective, e.g., a future month, a next calendar year, a next renewal date, etc. In some embodiments, the request type and transaction type can be combined. In other embodiments, the request type and transaction type may be separately tracked to distinguish types of requests from present/future effective dates of the requests. The correspondence classifier 604 can use data identified through the ingestion process 602 to classify the email message 300 into one of a plurality of known types or an unknown type. The AI models 126 can be trained for classification based on driver data, vehicle data, address data, location data, name data, additional (e.g., supplemental) data, coverage data, limit data, and/or other/unknown data, for instance.

A process check 606 can determine whether the request type of the correspondence classifier 604 is supported by further steps of the process 600. If the request type is not supported at process check 606, the email message 300A can be released by changing the status 404A from "reserved" back to "available". There may be other flags to prevent the process 600 from attempting to process the same email message 300A again. If the request type can be processed at process check 606, then process 600 can proceed to entity extraction 608. The entity extraction 608 can apply AI models 126 to extract information needed to process text in the entities 326 and may use values from the correspondence data 305 and/or attachments 306 to assist in interpreting the free-form content 324 of the email message 300A. The AI models 126 can determine degrees of confidence of the entities 326. Examples of entities 326 can include one or more of a policy name 506, an account number 508, an account name 510, an entity name 512, and a transaction effective date 514. Other entities 326 are contemplated. Upon completing entity extraction 608, the process controller 128 can determine at block 610 whether further processing can be performed. As an example, the process controller 128 can perform a lookup of the entities 326 in one or more records 502A-502N of database 134 based on determining that the confidence level is above a confidence threshold. For instance, if there is higher confidence that a policy name 506 has been extracted from the entities 326, the lookup operation may determine whether the policy name 506 maps to a unique record 502A-502N, with the other related fields extracted from the matching records 502A-502N (e.g., an account number 508, an account name 510, an entity name 512, and a transaction effective date 514). Other data, such as the content of the body 304 or files 328, can represent supplemental data 516 along with other information.

If processing cannot be performed at block 610, for instance, where there is no match in the database 134 or no entities 326 with a high enough level of confidence, then the email message 300A can be released by changing the status 404A from "reserved" back to "available". If there was a match to one or more records 502A-502N, then corresponding fields from the records 502A-502N and any related data extracted from the email message 300A can be used to generate a processing request 612. For instance, if the email message 300A is classified as updating an address, the processing request may include routing of the update to a particular secondary system or process that differs from a limit change request. Some processing requests can be automated to make a change absent human intervention, while other processing requests may prefill one or more forms with data for confirmation or additional analysis. Upon processing, the email message 300A can have a change in status 404A from "reserved" to "completed" or the email message 300A may otherwise be removed from the email message repository 130.

Figure 7:
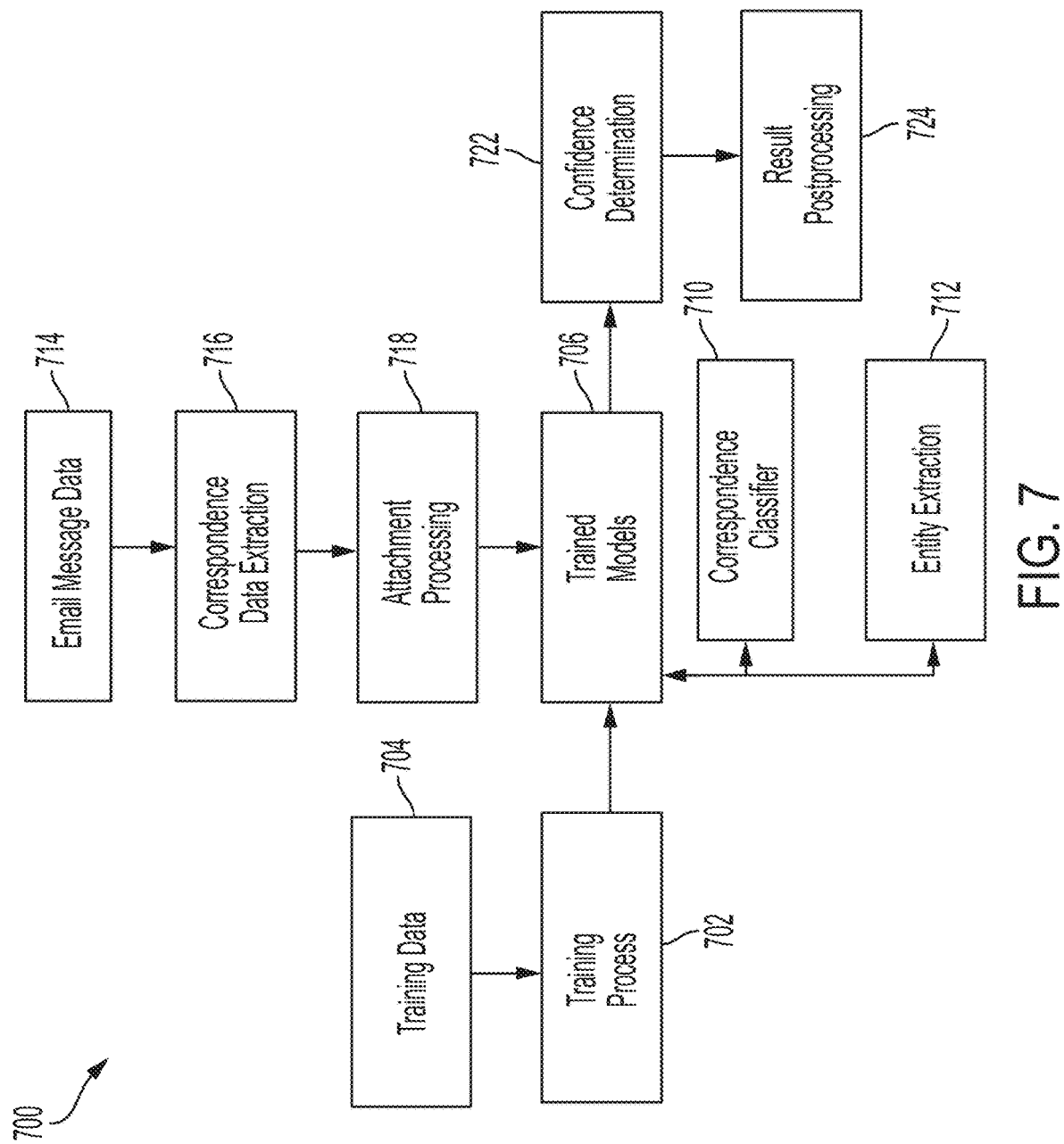
FIG. 7 depicts a model training and usage process according to some embodiments of the present invention.

FIG. 7 depicts a model training and usage process 700 according to some embodiments. The model training and usage process 700 can include a training process 702 that analyzes training data 704 to develop trained models 706 as examples of the AI models 126 of FIG. 1. The training process 702 can use labeled or unlabeled data in the training data 704 to learn features, such as a name formats, number formats, date formats, and/or other derived characteristics. The training data 704 can include a set of training data to establish a ground truth for learning coefficients/weights and other such features known in the art of machine learning to develop trained models 706. The trained models 706 can include a family of models to identify specific types of features from input data. For example, the trained models 706 can include a correspondence classifier 710 and entity extraction 712. Other such models and further subdivision of the trained models 706 can be incorporated in various embodiments. The correspondence classifier 710 can identify, for instance, a type of request embodied in an email message 300. The entity extraction 712 can identify the entities 326 in free-form content 324 and/or from files 328 in attachments 306. Further, the entity extraction 712 can be tuned to look for specific features, such as distinguishing policy numbers from account numbers, account names from entity names, and other such variations.

Input data can be partitioned or tagged based on email message data 714 as processed portions of the header 302, body 304, and attachments 306 of an email message 300 using correspondence data extraction 716, and attachment processing 718. Correspondence data extraction 716 can parse fields of the correspondence data 305 and provide tagged data values for use by trained models 706. Correspondence data extraction 716 may also perform a cleaning step to normalize variations, such as capitalization, abbreviations, and the like. Attachment processing 718 can include format conversions. As one example, attachment processing 718 can include performing one or more of optical character recognition, audio-to-text conversion, and image classification of the one or more attachments prior to performing the extracting of the entities.

Applying the trained models 706 to input data can result in a confidence determination 722 associated with classified and extracted entities. The confidence determination 722 can produce confidence scores for multiple types of entities 326 to assist in determining which type of entity 326 is most likely represented. As greater details are refined, the trained models 706 can make more accurate classifications and entity distinctions. The results of the confidence determination 722 can be further conditioned by result postprocessing 724. The result postprocessing 724 can cross-compare results of the confidence determination 722 to make a final determination of the most likely entity. The result postprocessing 724 can pass processing results along with related values from the database 134 of FIG. 1 for further processing.

Figure 8:
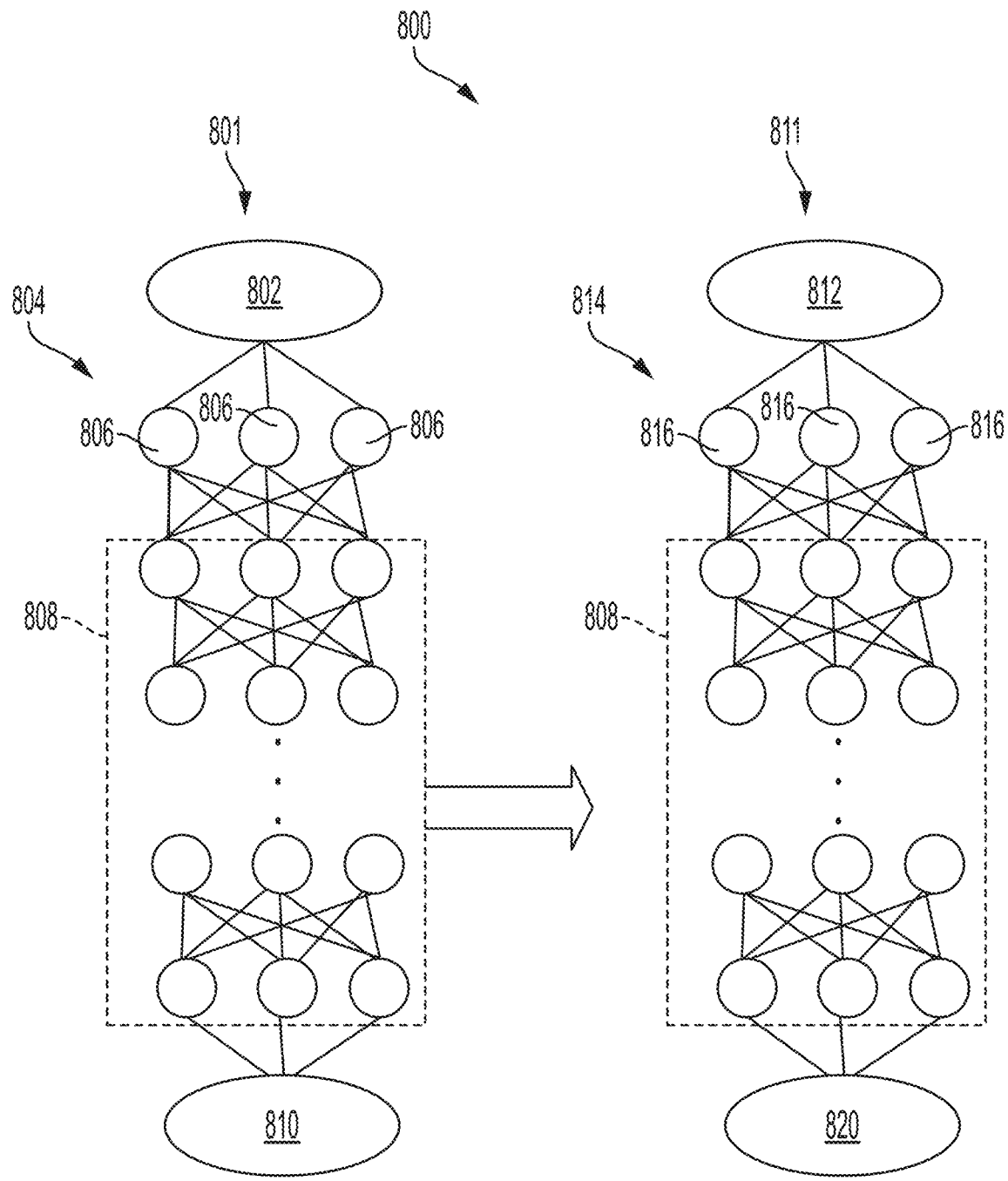
FIG. 8 depicts a model training transfer process according to some embodiments of the present invention.

FIG. 8 depicts a model training transfer process 800 according to some embodiments. The model training transfer process 800 can use an existing one of the trained models 706 of FIG. 7 to train other models. For instance, once a policy number model is trained, a similarly structured model can be used for account number detection, as both have similar features such as numerical grouping patterns and the like. As an example, a first trained model 801 can include a model head 802 that defines initial parameters followed by a plurality of model stages 804. The model stages 804 can include a structure of nodes 806 forming a neural network or belief network with various weights and parameters that flow through a model core 808 to a first model result 810. The model core 808 can include a number of lower level relationships to identify characteristics, such as uniformity, edges, and the like. The model core 808 can include one or more model stages 804 of interrelated nodes 806 between the model head 802. Although depicted as three nodes 806 per model stage 804, it will be understood that any number of nodes 806 can be included per model stage 804, including a varying number per model stage 804. The model training transfer process 800 can include transferring the model core 808 after training of the first trained model 801 is complete to act as a starting point for training of a second model 811. The second model 811 can include a model head 812 that defines initial parameters followed by a plurality of model stages 814. The model stages 814 can include a structure of nodes 816 forming a neural network or belief network with various weights and parameters that flow through a copy of the model core 808 of the first trained model 801 to a second model result 820. Starting the training of the second model 811 with the model core 808 of the first trained model 801 can decrease the amount of processing time needed for the second model 811 to complete training.

Figure 9:
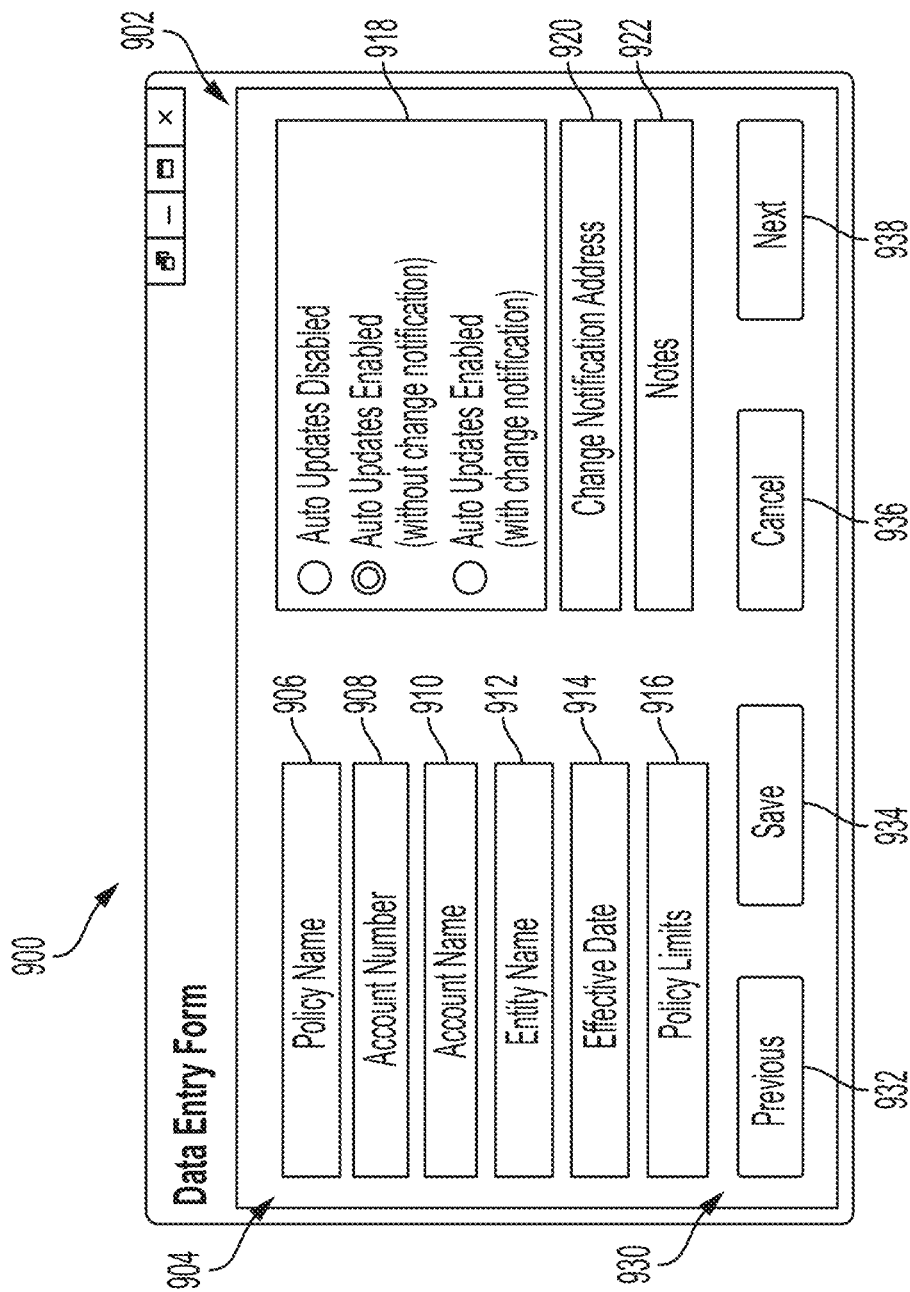
FIG. 9 depicts a data entry form example according to some embodiments of the present invention.

FIG. 9 depicts a data entry form 900 example according to some embodiments. In the example of FIG. 9, the data entry form 900 provides a user interface 902 that can allow a user to view, edit, and/or add to prepopulated data fields 904. Examples of the prepopulated data fields 904 include a policy name 906, an account number 908, an account name 910, an entity name 912, a transaction effective date 914, and policy limits 916. The data entry form 900 can also include options 918 for allowing auto updates from the process controller 128 of FIG. 1 to flow through with or without a notification of the change to be generated. Change notifications can trigger messages through a change notification address 920. A notes 922 field can be used to add free-form text and/or links to source data. A plurality of command interfaces 930 can also be incorporated in the data entry form 900. For example, the command interfaces 930 can include selectable buttons to transition to a previous interface 932, save data 934, cancel entry 936, and transition to a next interface 938. Although one example is depicted in FIG. 9, it will be understood that many variations are contemplated, including additional interfaces, command options, and data entry/editing options.

Figure 10A:
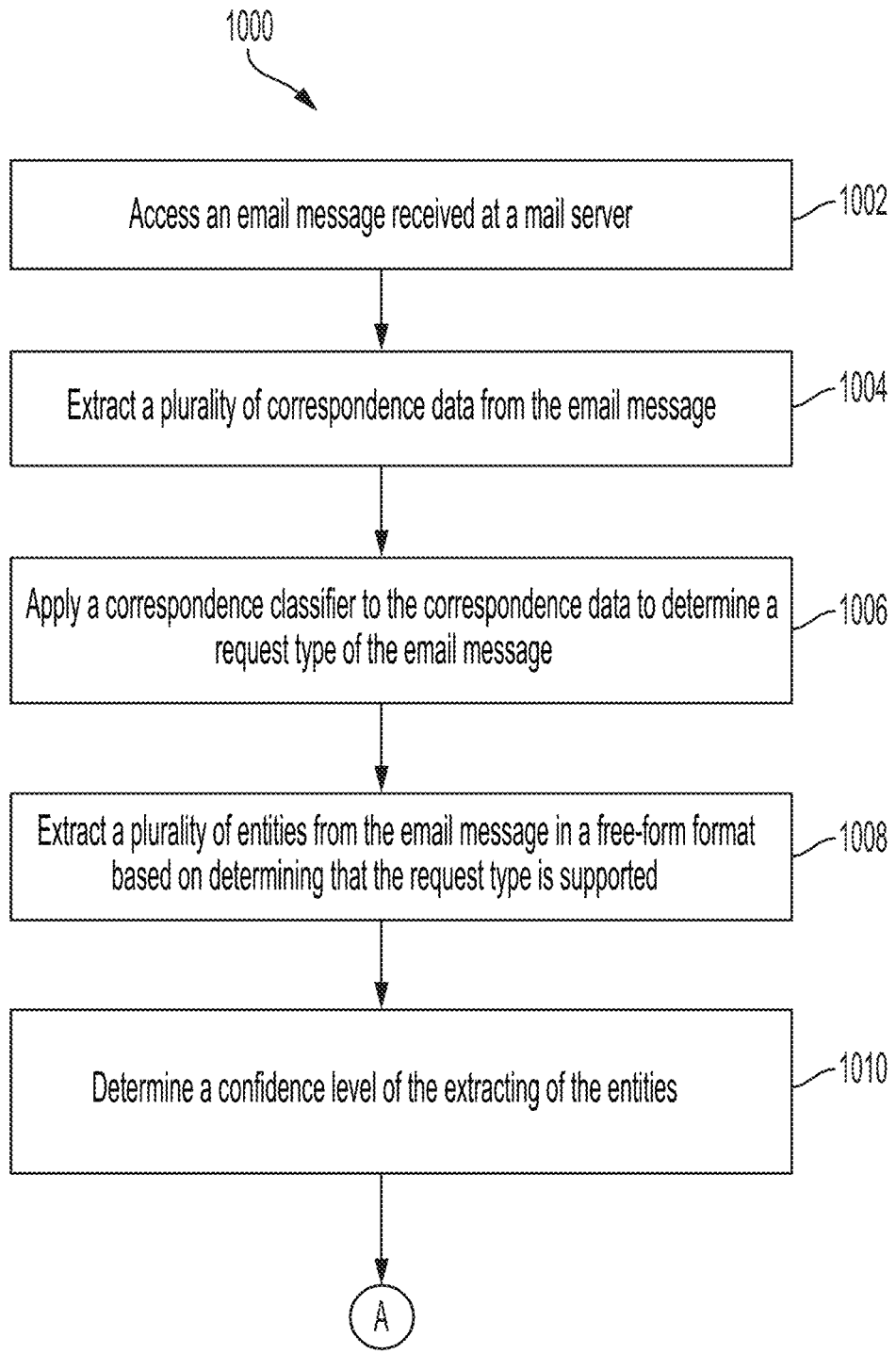
FIGS. 10A and 10B depict a process flow according to some embodiments of the present invention.
Figure 10B:
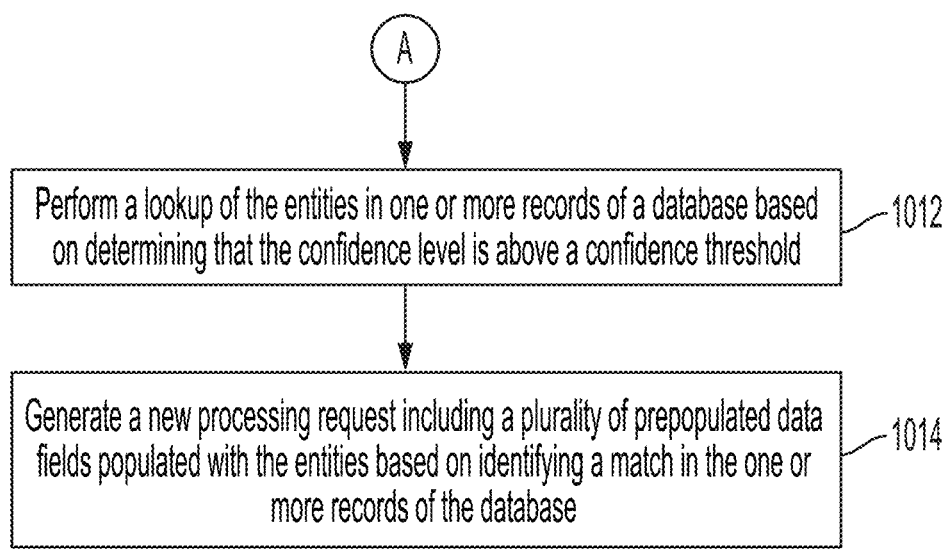

Turning now to FIGS. 10A and 10B, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the data processing server 105 of FIG. 1 in combination with the mail server 102, the one or more user systems 106, and/or the one or more data storage servers 110. The process flow 1000 is described in reference to FIGS. 1-10B.

At step 1002, the data processing server 105 can access an email message 300 received at a mail server 102. The email message 300 can be reserved for analysis, where the reserving prevents user access to the email message 300 at the mail server 102. At step 1004, the data processing server 105 can extract a plurality of correspondence data 305 from the email message 300.

At step 1006, the data processing server 105 can apply a correspondence classifier 604 to the correspondence data 305 to determine a request type of the email message 300. The correspondence data 305 can include one or more of a recipient identifier 310, a sender identifier 308, a subject 314, a body 304, and one or more attachments 306.

At step 1008, the data processing server 105 can extract a plurality of entities 326 from the email message 300 in a free-form format from free-form content 324, where the extracting is performed based on determining that the request type is supported. One or more attachments 306 to the email message 300 can be removed (e.g., files 328) and the extracting of the entities 326 can be performed based on the one or more attachments 306. Before or as part of the extracting of the entities 326, one or more conversion can be performed, such as optical character recognition, audio-to-text conversion, and image classification of the one or more attachments. The entities 326 can include one or more of a policy name 506, an account number 508, an account name 510, an entity name 512, and a transaction effective date 514.

The reservation of the email message 300 can be released based on determining that the request type is not supported. At step 1010, the data processing server 105 can determine a confidence level of the extracting of the entities 326.

At step 1012, the data processing server 105 can perform a lookup of the entities 326 in one or more records 502A-502N of a database 134 based on determining that the confidence level is above a confidence threshold. A data format normalization filter can be applied to one or more of the entities 326 prior to performing the lookup. The reservation of the email message 300 can be released based on determining that the confidence level is below the confidence threshold.

At step 1014, the data processing server 105 can generate a new processing request comprising a plurality of prepopulated data fields populated with the entities 326 based on identifying a match in the one or more records 502A-502N of the database 134. A status of the email message 300 can be changed to a "completed" status based on the new processing request. The email message 300 can be removed from an inbox of the mail server 102 based on the new processing request. The prepopulated data fields can be further populated with at least one value from the one or more records 502A-502N identified by the lookup. Training the correspondence classifier 604 can be performed using a first training data set and an entity extractor 608 to perform the extracting of the entities 326 based on a second training data set. The first training data set can be associated with a classifier machine-learning structure, and the second training data set can be associated with an entity extractor machine-learning structure. Transfer learning, such as model training transfer process 800, can be applied to train one or more of the correspondence classifier 604 and the entity extractor machine-learning structure.

The process flow 1000 can be performed responsive to user requests through one or more user applications 132. The data processing server 105 and/or one or more user systems 106 can provide an interactive interface through a graphical user interface, such as user interface 902.

Figure 11:
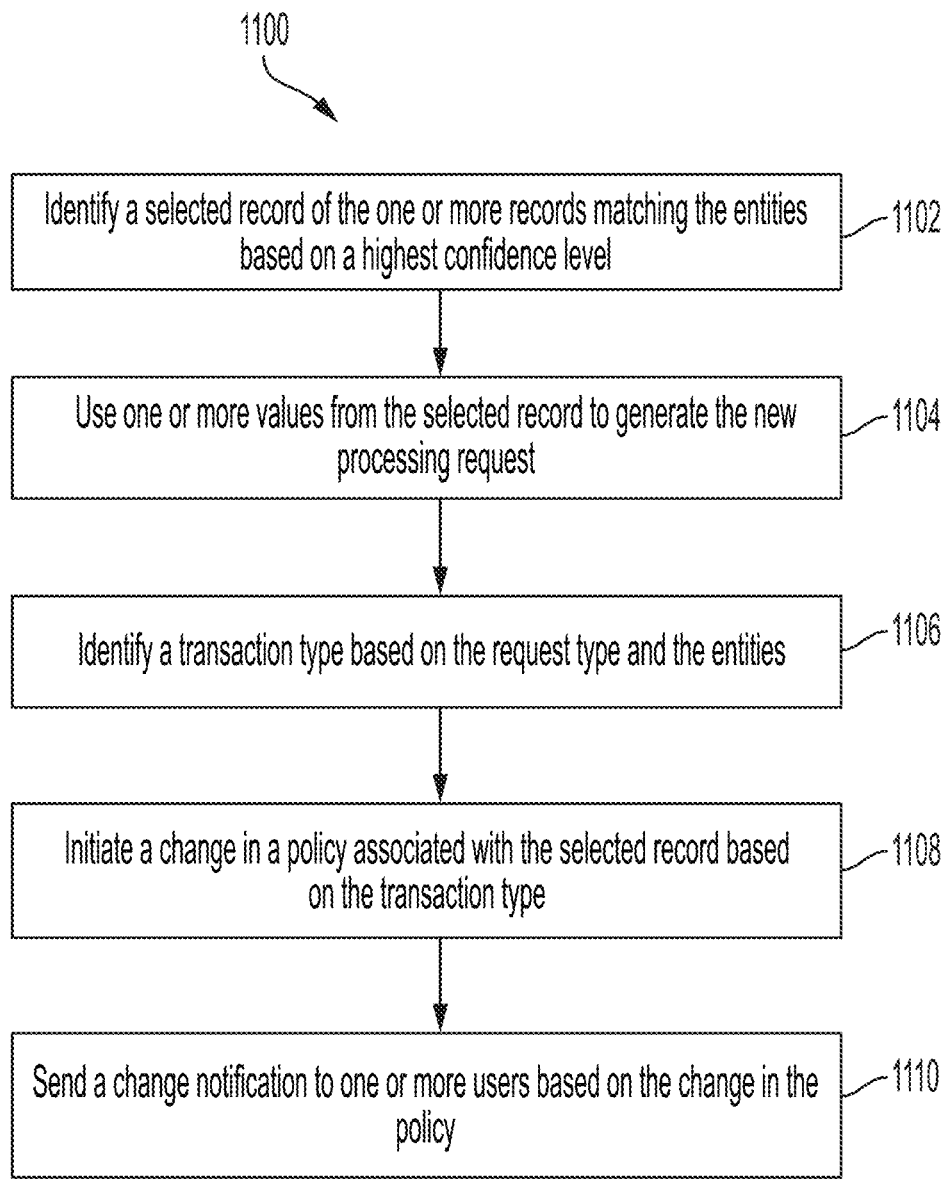
FIG. 11 depicts a process flow according to some embodiments of the present invention.

Process flow 1000 can be further enhanced to include one or more steps of process 1100 of FIG. 11. Although process 1100 is illustrated as a sequential flow, various steps of process 1100 can be selectively performed or omitted in embodiments. Further, steps of process 1100 can be incorporated within the process flow 1000 of FIGS. 10A and 10B or performed separately. At step 1102, the data processing server 105 can identify a selected record 502A-502N of the one or more records matching the entities based on a highest confidence level.

At step 1104, the data processing server 105 can use one or more values from the selected record to generate the new processing request. At step 1106, the data processing server 105 can identify a transaction type based on the request type and the entities. The transaction type can be an immediately effective transaction to implement a request associated with the request type. Alternatively, the transaction type can be a future transaction type that sets a future date for implementing the request associated with the request type, such as a next month, year, renewal period, and the like.

At step 1108, the data processing server 105 can initiate a change in a policy associated with the selected record based on the transaction type. For example, an immediate transaction type can be initiated immediately. A future transaction type can set a date to trigger a change in terms of a policy based on transaction effective date. At step 1110, the data processing server 105 can send a change notification to one or more users based on the change in the policy.

Technical effects include email content extraction and pre-population of forms for enhancing system operation efficiency.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
a processing device; and
a memory device in communication with the processing device, the memory device storing instructions that when executed by the processing device result in:
accessing an email message received at a mail server;
extracting a plurality of correspondence data from the email message;
applying a correspondence classifier to the correspondence data to determine a request type of the email message;
extracting a plurality of entities from the email message in a free-form format, the extracting performed based on determining that the request type is supported;
determining a confidence level of the extracting of the entities;

performing a lookup of the entities in one or more records of a database based on determining that the confidence level is above a confidence threshold;

identifying a selected record of the one or more records matching the entities based on a highest confidence level;

using one or more values from the selected record to generate a new processing request comprising a plurality of prepopulated data fields populated with the entities based on identifying a match in the one or more records of the database;

identifying a transaction type based on the request type and the entities;

initiating a change in a policy associated with the selected record based on the transaction type; and sending a change notification to one or more users based on the change in the policy.

2. The system of claim 1, further comprising instructions that when executed by the processing device result in reserving the email message for analysis, the reserving preventing user access to the email message at the mail server;

and releasing reservation of the email message based on determining that the request type is not supported.

3. The system of claim 2, further comprising instructions that when executed by the processing device result in releasing reservation of the email message based on determining that the confidence level is below the confidence threshold.

4. The system of claim 1, further comprising instructions that when executed by the processing device result in removing one or more attachments to the email message; and performing the extracting of the entities based on the one or more attachments.

5. The system of claim 4, further comprising instructions that when executed by the processing device result in performing one or more of optical character recognition, audio-to-text conversion, and image classification of the one or more attachments prior to performing the extracting of the entities.

6. The system of claim 1, wherein the correspondence data comprises one or more of a recipient identifier, a sender identifier, a subject, a body, and one or more attachments.

7. The system of claim 1, wherein the entities comprise one or more of a policy name, an account number, an account name, an entity name, and a transaction effective date.

8. The system of claim 1, further comprising instructions that when executed by the processing device result in:
changing a status of the email message to a completed status based on the new processing request.

9. The system of claim 1, further comprising instructions that when executed by the processing device result in:
removing the email message from an inbox of the mail server based on the new processing request.

10. The system of claim 1, wherein the prepopulated data fields are further populated with at least one value from the one or more records identified by the lookup.

11. The system of claim 10, further comprising instructions that when executed by the processing device result in training the correspondence classifier using a first training data set; and training an entity extractor to perform the extracting of the entities based on a second training data set.

12. The system of claim 11, wherein the first training data set is associated with a classifier machine-learning structure, and the second training data set is associated with an entity extractor machine-learning structure.

13. The system of claim 12, further comprising instructions that when executed by the processing device result in applying transfer learning to train one or more of the correspondence classifier and the entity extractor machine-learning structure.

14. The system of claim 1, further comprising instructions that when executed by the processing device result in:
applying a data format normalization filter to one or more of the entities prior to performing the lookup.

15. A computer program product comprising a storage medium embodied with computer program instructions that when executed by a computer cause the computer to implement accessing an email message received at a mail server; extracting a plurality of correspondence data from the email message;
applying a correspondence classifier to the correspondence data to determine a request type of the email message;
extracting a plurality of entities from the email message in a free-form format, the extracting performed based on determining that the request type is supported;
determining a confidence level of the extracting of the entities;
performing a lookup of the entities in one or more records of a database based on determining that the confidence level is above a confidence threshold; and
identifying a selected record of the one or more records matching the entities based on a highest confidence level;
using one or more values from the selected record to generate a new processing request comprising a plurality of prepopulated data fields populated with the entities based on identifying a match in the one or more records of the database;
identifying a transaction type based on the request type and the entities; initiating a change in a policy associated with the selected record based on the transaction type;
and sending a change notification to one or more users based on the change in the policy.

16. The computer program product of claim 15, further comprising computer program instructions that when executed by the computer cause the computer to implement:
reserving the email message for analysis, the reserving preventing user access to the email message at the mail server; and
releasing reservation of the email message based on determining that the request type is not supported.

17. The computer program product of claim 16, further comprising computer program instructions that when executed by the computer cause the computer to implement:
releasing reservation of the email message based on determining that the confidence level is below the confidence threshold.

18. The computer program product of claim 15, further comprising computer program instructions that when executed by the computer cause the computer to implement removing one or more attachments to the email message; and performing the extracting of the entities based on the one or more attachments.

19. The computer program product of claim 18, further comprising computer program instructions that when executed by the computer cause the computer to implement:
performing one or more of optical character recognition, audio-to-text conversion, and image classification of the one or more attachments prior to performing the extracting of the entities.

20. The computer program product of claim 15, wherein the correspondence data comprises one or more of a recipient identifier, a sender identifier, a subject, a body, and one or more attachments, and the entities comprise one or more of a policy name, an account number, an account name, an entity name, and a transaction effective date.

21. The computer program product of claim 19, further comprising computer program instructions that when executed by the computer cause the computer to implement:
    changing a status of the email message to a completed status based on the new processing request.

22. The computer program product of claim 15, further comprising computer program instructions that when executed by the computer cause the computer to implement removing the email message from an inbox of the mail server based on the new processing request.

23. The computer program product of claim 15, wherein the prepopulated data fields are further populated with at least one value from the one or more records identified by the lookup and further comprising computer program instructions that when executed by the computer cause the computer to implement:
    training the correspondence classifier using a first training data set; and
    training an entity extractor to perform the extracting of the entities based on a second training data set, wherein the first training data set is associated with a classifier machine-learning structure, and the second training data set is associated with an entity extractor machine-learning structure, and transfer learning is applied to train one or more of the correspondence classifier and the entity extractor machine-learning structure.

* * * * *